Aug. 26, 1930.    A. E. LARD    1,774,386
PROCESS OF PRODUCING METALLIC TUBES OR SHAFTS
Filed July 17, 1928    2 Sheets-Sheet 1
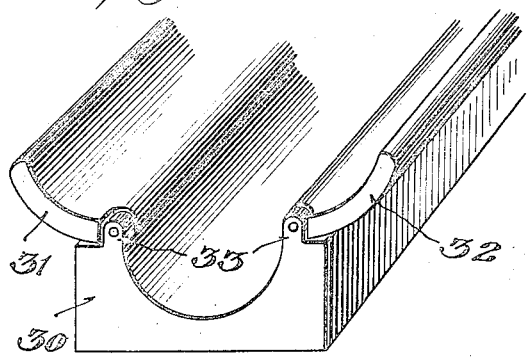
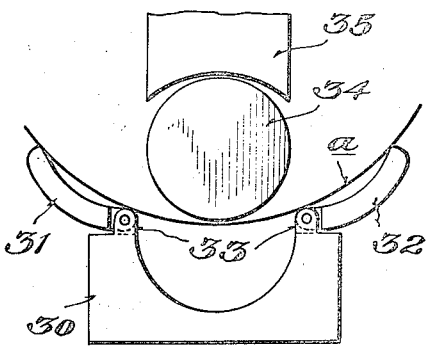
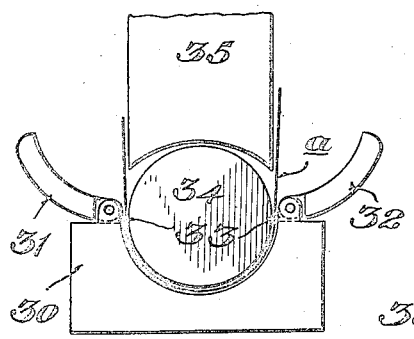
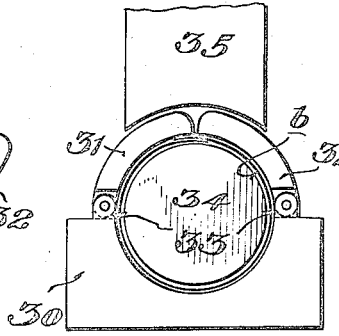
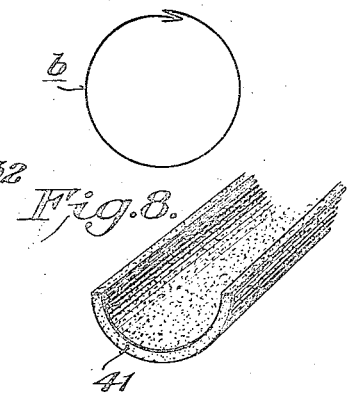
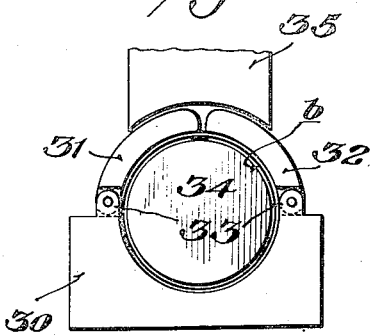
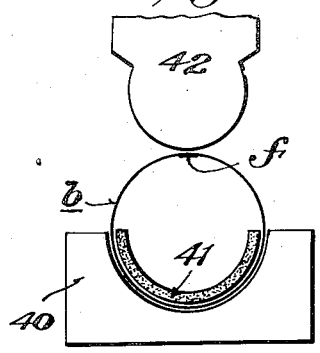
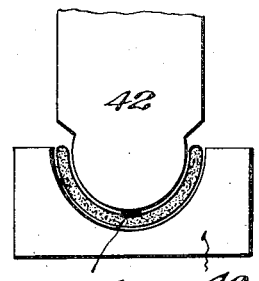
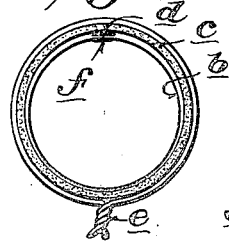
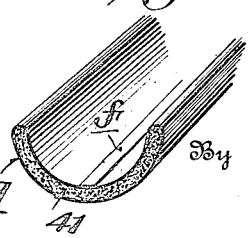
Inventor
Allan E. Lard,
By Mauro & Lewis,
Attorneys

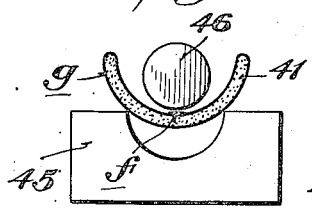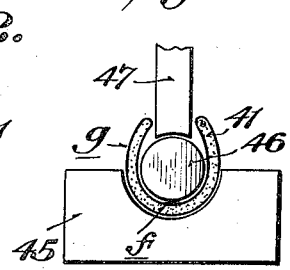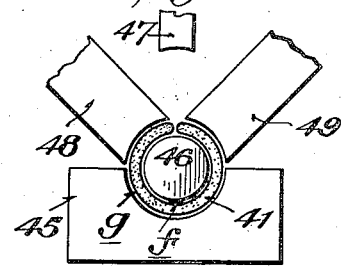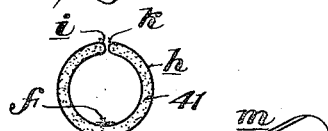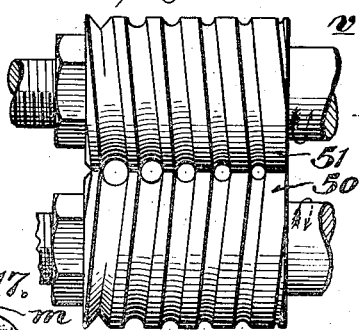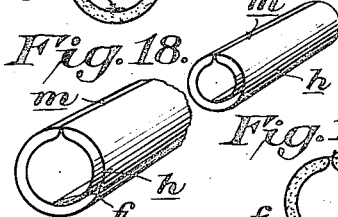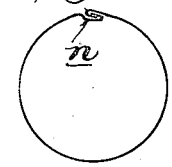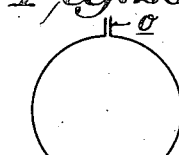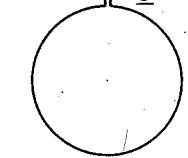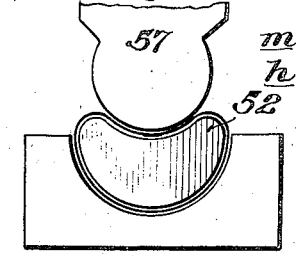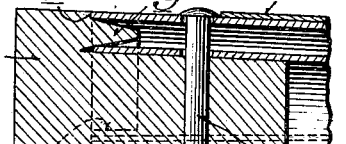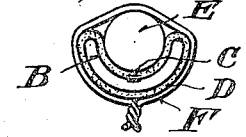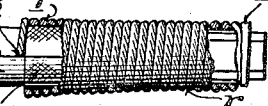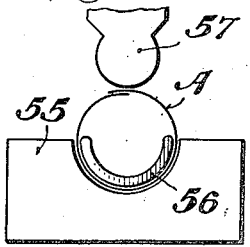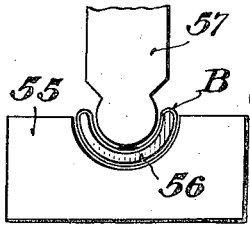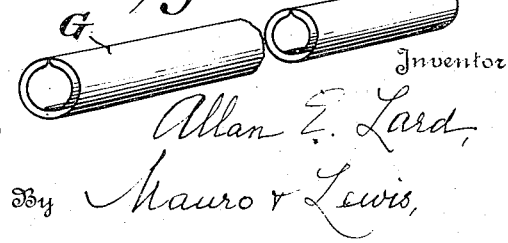

Patented Aug. 26, 1930

1,774,386

UNITED STATES PATENT OFFICE

ALLAN E. LARD, OF WASHINGTON, DISTRICT OF COLUMBIA, ASSIGNOR TO THE METALLIC SHAFT COMPANY, OF WILMINGTON, DELAWARE, A CORPORATION OF DELAWARE

PROCESS OF PRODUCING METALLIC TUBES OR SHAFTS

Application filed July 17, 1928. Serial No. 293,419.

This invention relates to improvements in metallic tubes, shafts, or shapes and process of producing the same. The process is claimed herein; the metallic shaft or tube is claimed in divisional application, Ser. No. 398,381, filed October 9, 1929.

One object of the invention is the production of such tubes, shafts, or shapes having the desired torsion. Another object is to so form a metallic tube that said formation will duplicate a fine hickory golf shaft in torsion, weight, flexibility and balance. Another object is to so form and process the metallic golf shaft that same will be a practical, commercial, inexpensive article. Still other objects will be apparent from the detailed description and accompanying drawings.

The torsioning metallic construction of this invention is designed for use in golf club shafts and for other uses in tubular constructions where the shock absorbing, stress relieving characteristics of torsion are desired, or where the resilient spring action of torsion is desired.

It is a known fact that a thin walled tubular seamless golf shaft having approximately the same weight, flexibility and balance as a hickory golf shaft, and such as heretofore on the market, has practically no torsion as compared with the torsion of a hickory shaft. The degree of torsion inherent in hickory is one of the fundamental requisites of a golf shaft; hence metallic golf shafts lacking said degree of torsion are fundamentally defective.

In the drawings, wherein the invention is illustrated in connection with a shaft for golf clubs:—

Fig. 1 is a perspective view of a die suitable for use in the first steps of the process;

Figs. 2, 3 and 4 are views in end elevation illustrating different stages of the process employing the die such as shown in Fig. 1;

Fig. 5 illustrates the next stage of the process and shows the metallic tube in end view at its larger end;

Fig. 6 illustrates the next step of the operation by a view similar to Fig. 4;

Fig. 7 illustrates the metallic tube in end elevation (viewed from its larger end) wrapped with asbestos and bound with wire preparatory to brazing of the joint;

Fig. 8 is a perspective view of part of a lead filler, spacer or separator used in later steps of the operation;

Figs. 9, 10, 11, 12, 13 and 14 illustrate stages of the operation following the brazing and in which stages the lead spacer, filler or separator is used;

Fig. 15 illustrates the metallic tube in end elevation (viewed from its larger end) and still containing the lead spacer.

Fig. 16 shows in elevation a pair of rolls to the action of which the metallic tube of Fig. 15 is subjected;

Fig. 17 illustrates the metallic tube in end elevation (viewed from its larger end) after it has been operated upon by the rolls of Fig. 16;

Fig. 18 is a perspective view of the metallic tube (with its larger end forward) after the lead filler or spacer has been melted out;

Figs. 19, 20 and 21 illustrate modifications of early stages of the process;

Fig. 22 is an end view from the smaller end of the metallic tube illustrating the application of a fabric covering;

Fig. 23 is a detail view of the small end of the metallic tube showing it covered with the fabric and then wound about with cord;

Fig. 24 illustrates the metallic tube as finished to constitute a commercial golf shaft;

Fig. 25 is a larger scale detail longitudinal sectional view through one half of the left hand end of the finished shaft of Fig. 24;

Figs. 26, 27 and 28 illustrate modifications of early stages of the process as employed in the production of a non-tapered shaft; and Fig. 29 is a perspective view of a non-tapered straight shaft of this invention.

What is now believed to be the preferred embodiment of the process of this invention, as applied to the production of a golf shaft embodying this invention, will be described in conjunction with the accompanying drawings.

Starting with a strip $a$ gradually diminishing in width towards one end, said strip being of high carbon sheet steel about .011" thick and 43" long, and with a die 30 such as shown in Fig. 1, said strip is placed over said die in the manner illustrated in Fig. 2. As shown, said die has two quarter segments 31 and 32, hinged to the base of the die in any suitable manner, as by pivot pins passing through upstanding lugs 33 on the base of the die, each lug fitting in a notch in the edge of its segment. Any desired number of such lugs and pivot pins may be used for each segment. The shape of the strip $a$ is such that when it is bent to tubular form about a tapering arbor approximately 43" long, 1.073" in diameter at its large end, and .500" in diameter at its small end, the long edges of the strip will overlap about $\frac{3}{16}$". The outside diameter of this tube, not including overlap, is, therefore, approximately 1.095" in diameter at its large end and .522" at its small end.

An arbor 34, of the dimensions above stated is now laid on the strip $a$ directly over the middle of the groove of the die 30, Fig. 2, and the punch 35 of the press is operated thereby U-ing up the strip $a$ in the manner shown in Fig. 3. The groove of the die 30 is 43" long and is made about $\frac{1}{32}$" larger than the diameter of the arbor 34 to allow sufficient tolerance or clearance for the sheet steel; the taper of said groove corresponds with the taper of the arbor.

The punch 35 is now elevated from the position in which it is shown in Fig. 3, and the segments, first the left segment 31 and then the right segment 32, are forced against the upstanding sides of the blank $a$ until both sides are pressed over far enough to permit the punch 35 to descend into engagement with the segments, whereby the strip is shaped into a tube $b$ with the right hand edge of the strip overlapping its left hand edge $\frac{3}{16}$"—all as shown in Fig. 4.

The arbor 34 is withdrawn from the tube $b$ and the tube $b$ is removed from the die 30 and $\frac{1}{8}$" of the $\frac{3}{16}$" overlap of the right hand edge is bent to form a V-shaped groove (by any suitable die or bending machine operation) and $\frac{1}{16}$" of the left hand edge of the strip is seated in said groove, as shown in Fig. 5.

The arbor or mandrel 34 is again placed within the tube $b$; the tube and mandrel are placed in the die 30; and the segments 31 and 32 are closed against the tube and the punch 35 operated, whereby the walls of the V-shaped groove are compressed into tight engagement with the interposed left hand edge of the strip—all as shown in Fig. 6.

The tube $b$ is now removed from the die 30, and the mandrel 34 removed from the tube. Then, as shown in Fig. 7, a thin strip $d$ of copper alloy, having a melting temperature above the quenching temperature, is placed lengthwise of the tube, preferably along the exterior thereof, and over the joint formed by the interlocking edges; asbestos tape $c$ is wound about the tube and over the copper alloy strip $d$. The tape may also be bound with annealed steel wire $e$. The tube thus covered is placed in a hydrogen atmosphere furnace and the lengthwise joint of the tube brazed. After the tube is thus brazed the asbestos is removed and the tube annealed.

The tube $b$ is now placed in a die 40, Fig. 9 (having its groove of the same dimensions as that of die 30) with the brazed joint $f$ of the tube upward; and a lead filler, spacer or separator 41 (of Fig. 8) is placed within the tube along the downward side thereof—all as shown in Fig. 9. The spacer or separator 41 is of trough-like shape (semi-annular in cross-section), die-formed from a strip of lead about .070" thick and 43" long and thus shaped to dimensions to fit the inside surface of the tube $b$ up to the level of about one-half the inside diameter thereof, as clearly shown in Fig. 9. A punch 42, Fig. 9, is now operated and the upper half of the tube $b$ thereby folded downwardly upon, and in effect wrapped closely about the lead separator or spacer 41, the metal of the tube drawing across and around the angular relatively soft edges of said lead separator or spacer and imparting to said edges a slightly rounded formation—all as shown in Fig. 10. The surface dimensions of the punch 42 correspond to the interior dimensions of the groove of die 40, except that they are sufficiently smaller to allow for the combined thicknesses of the two thin steel walls and the lead separator 41 which are interposed between said surfaces of the punch and groove of the die, as shown in Fig. 10.

Fig. 11 more clearly shows the trough-like member, blank, or tube $g$, of semi-annular shape cross-section, produced at this stage of the process and consisting of the thin steel walls, or metallic sheaths, which previously constituted the tube $b$ with the brazed joint $f$ extending along the inner one of said walls and the lead spacer, spacing element, filling, or core 41 encased within said tube.

In the next step of the process, shown in Fig. 12, the member $g$ of Fig. 11 is placed over the groove of a die 45 and an arbor 46 is laid in said member. The arbor is 43" long and tapers from an approximate diameter of .458" at one end down to an approximate diameter of .146" at its other end. The groove of die 45 is correspondingly shaped but of larger dimensions to accommodate the walls of the tube and the separator 41. A punch 47 is next operated and the arbor and die caused to impart to the member $g$ a horseshoe shaped cross section—all as shown in Fig. 13.

Punch 47 is then elevated and two one-quarter segment punches 48 and 49, slidably mounted at 45° angle, are operated, thereby imparting to the member $g$ an annular shape in cross section—all as shown in Fig. 14.

Member $g$, Fig. 14, is now removed from the die 45, and the mandrel or arbor 46 is removed from said member, but preferably the mandrel is allowed to remain in the shaft during the rolling operation next described. Thus there is produced the tapered tubular construction or metallic shaft $h$ illustrated in end view in Fig. 15 and having a seam extending longitudinally thereof consisting of opposing rounded edges $i$ and $k$, the lead spacer 41 holding the walls a uniform distance apart. The tubular shaft thus produced at this stage of the process is itself a new article of manufacture, and it is adapted to be further treated as hereinafter described for the production of a shaft suitable for golf clubs.

The shaft $h$ of Fig. 15, with the lead spacer 41 still in it, is now passed between a pair of rolls 50, 51, such as shown in Fig. 16, adapted to square up the outer rounded edges $i$ and $k$ of Fig. 15 and cause them to abut in a manner to form a neat close abutted seam such as illustrated at $m$ in Fig. 17. As also shown by said figure, the brazed joint $f$ is on the inside of the tubular shaft and hence invisible.

The rolls 50 and 51 are such as constitute parts of a machine designed by the Horton Manufacturing Company, of Bristol, Connecticut, and used by said company in the manufacture of the well known "Bristol" golf shaft. The small end of the golf shaft $h$ (Fig. 15) is introduced between said rolls at the small end (at the right, Fig. 16) of the opposing spiral grooves of the rolls, and with the rolls rotating in the directions indicated by the arrows. When the shaft has moved along until the large end thereof has been reached, with the shaft at that time positioned in the large ends of the spiral grooves at the left of Fig. 16, the direction of rotation of the rolls is automatically reversed. When the small end of the shaft is again reached there is another automatic reversal of the direction of rotation of the rolls; and so on. Each shaft is thus carried forward and backward through the rolls a number of times sufficient to impart the desired abutted finish at the seam, the operator applying such endwise pressure, or pull, upon the shaft as may be required to keep it firmly engaged by the walls of the spiral grooves.

After the shaft $h$ has been operated upon by the rolls and brought to the condition shown in Fig. 17, the lead separator 41 is melted out by placing the shaft in a suitable furnace. The separator cannot be withdrawn bodily because of the taper of the shaft. The shaft as shown in Fig. 18 with the separator removed is then heat treated, straightened, and rust proofed. The preferred outside dimensions of a 43″ drive shaft when thus finished are approximately .625″ at the large end and .338″ at the small end.

In the aforesaid forming operations in which the lead spacer or separator 41 is used, it holds the thin steel walls a uniform distance apart. The thickness of this lead determines the space between said steel walls and thereby determines the degree of torsion in the finished tube or golf shaft. The thinner the lead, that is, the less the space between the thin steel walls, the greater the degree of torsion that will be developed under a given stress and a given diameter of shaft. The length of stroke of the punch 42, Figs. 9 and 10, must, of course, be regulated. In the production of the model 43″ driver shaft, from which these specifications were taken, the lead was approximately .070″ thick. This shaft, tried in actual play, is an unqualified success.

It will be noted that the shaft thus produced as the result of the hereinbefore described series of steps, or process operations, comprises two tubes, or shapes, or walls, of annular cross-section, one within the other, the inner joined to and suspended or supported from the outer, as shown in Fig. 18; and that said shaft or tube has a seam $m$ extending longitudinally thereof, constituted by opposing or contiguous edges which may closely abut, as in Fig. 18, or be separated as in Fig. 15. In other words, the opposing edges are not fastened together. They constitute an "open" seam, the edges of which are free for slight movement relatively to each other when the shaft is subjected to torsional stress or strain. Said seam may be concealed, if desired, by inserting any suitable material between said opposing edges and then buffing said material flush with the metal, the filling material being anchored by means of the pressure of the walls of the seam thereon. By this invention there is thus produced a tubular metal golf shaft of circular cross-section, which possesses the torsion, weight, flexibility and balance of a fine hickory golf shaft; and this has been confirmed by actual demonstration and comparison with shafts of hickory. By the use of steel somewhat thinner than is used in the ordinary steel golf shafts, it is possible by this invention and by reason of the two walls, to obtain greater strength without materially increasing the weight.

Forms of joints other than that illustrated in Fig. 5 may of course be employed at that stage of the process. For example, the two edges may be crimped together, or they may be interlocked in the manner illustrated in Fig. 19, wherein an offset $n$ is provided for abutment. This abutment, as well as the gothic V-abutment of Fig. 5, prevents the walls from closing under the winding pressure of the asbestos tape and causing a separation or gap which would render a sound brazed joint impossible.

Instead of starting the process with a strip $a$ of high carbon sheet steel, low carbon steel carburized to a high carbon content and heat treated may be used. In that event it is preferable to weld the joint and to that end the strip is formed into a tube with the edges thereof bent to form radially projecting opposing lips about $\tfrac{3}{32}''$ wide, such as shown at $o$ in Fig. 20, and said lips are then spot-welded or seam welded. The tube is then carburized and annealed; but if preferred this can be postponed until after the rolling operation. The lead filler, spacer or separator 41 is then placed in the tube, the same as in Fig. 9, and the process is continued the same as hereinbefore described.

Instead of brazing or welding the joint in advance of the stage of the operation illustrated in Figs. 9 and 10, the tube, after the operation shown in Fig. 5, or Fig. 19, may be partly folded over an arbor 52 shaped as shown in Fig. 21, and the brazing or welding of the joint then performed, thus lessening the strain upon the brazed or welded joint incident to the folding operation under the initial movement of the punch 42, Fig. 9.

Instead of welding or brazing, the joint $f$, Fig. 9, may be formed by riveting. Or proper lengths of cold drawn seamless tubing, drawn or swaged to the desired taper and drawn, swaged or "stropped" to the desired thickness of walls, may be used instead of the tube $b$, Fig. 9. Duralumin or similar alloy metal may be used, in the form of a seamless tapered tube, the wall thereof being thicker than that of steel but gauged to weigh the same. The thicker wall of course has less torsion, but this may be offset by correspondingly decreasing the space between the two walls and the desired torsion thus obtained. Molybdenum steel tubing may be used.

The filler, spacer, or separator 41, Figs. 8 to 15, is preferably made of sheet lead of uniform thickness; but lead of gradually diminishing thickness may be used if desired. And instead of lead, Rose metal, or any other firm material, including wood, capable of being melted or burned out, may be used.

Having produced the metal shaft $h$ of Fig. 18, it is desirable to make certain additional provisions for its use as a golf club shaft. To prepare its small end to be glued in the socket of a wooden head, the preferred procedure is as follows: Acetone (or a similar elastic cement having the characteristics of bonding and shrinking the material to the shaft) is applied over a section of said small end of the shaft about $3''$ in length and a fabric covering or sleeve $p$, Fig. 23, is then slipped over said section. Said sleeve $p$ is larger (about $\tfrac{1}{8}''$ larger in diameter) than the shaft, thus providing an excess of fabric for a purpose stated below. Wedges (not shown) are now forced into the seam $m$ of the shaft $h$ just beyond each end of the fibrous sleeve $p$, thus slightly spreading said seam. The excess of fabric in the sleeve $p$ is now forced down into the slightly spread seam $m$, as shown at $q$ in Fig. 22, thereby drawing the fabric to a tight fit around the shaft. The two wedges are now withdrawn allowing the spread seam to spring back to a tightly closed condition in which it securely grips and anchors the fabric between its edges.

The end of a string $r$, of cotton, or other suitable fiber, is now forced into the seam $m$ at $s$, in Fig. 23, thereby anchoring said end of the string. Acetone is now applied over the fabric sleeve $p$ and to the string $r$ and the string then wound spirally down to within a short distance of the extreme end of the shaft, where the string is laced through a transverse hole in the shaft and wedged in place by a peg $t$ driven into said hole—all as shown in Fig. 23. Cement is then applied over the string winding and the end of the shaft thus wound is dipped into fine sawdust. After this cement and sawdust covering has been allowed to set and dry, the end of the shaft is "chucked," the same as with hickory shafts, thus producing an evenly finished wooden surface $z$, Fig. 24, which duplicates the gluing surface at the end of a hickory shaft. Anchoring the fabric sleeve $p$ between the abutting edges of the seam $m$ serves, in conjunction with the cement and winding, to prevent said sleeve from slipping or becoming loose under the stress of the impact with the ball, or through the action of atmospheric changes in the wooden neck of the head of the club.

To prepare the large end of the metal shaft $h$ to receive the usual grip of leather or leather-like material, the preferred procedure is as follows: A fabric sleeve $u$ is applied to about $11''$ in length of said large end of the shaft, as shown in Fig. 24, and forced into the seam $m$ of the shaft and anchored therein, all by the same procedure as hereinbefore described with reference to fabric sleeve $p$ at the small end of the shaft. No string winding or sawdust covering is employed at the large end of the shaft, the anchoring of the fabric sleeve between the grip of the opposing edges of the seam $m$, in conjunction with the acetone, being sufficient to prevent any rotation or movement of the fabric sleeve relative to the metal shaft under the customary stress of play. The fabric $u$, unlike the steel surface to which it is applied, furnishes a gluing surface for the usual listing and leather grip.

A wooden extension plug $v$, Figs. 24 and 25, is now applied to the large end of the metal shaft $h$ and extends about $\tfrac{1}{2}''$ beyond it. The inner end or stem of the plug is of reduced diameter and fits closely within the inner metal wall of the shaft. The outer and projecting end or head of the plug is of larger diameter such as to be approximately flush with the outer surface of the outer wall of the shaft. Around the plug, at the offset between the head and stem thereof, there is a shoulder $w$ (see Fig. 25) at approximate right angles to the axis of the plug. Around the plug inside said shoulder there is a wedge-shaped collar $y$. After the plug $v$ is driven into the end of the metal shaft until the shoulder $w$ abuts the end of the outer wall of the shaft, a headed pin $x$ is inserted through holes in both walls of the tube and the plug, and the pin then riveted, all as shown in Figs. 24 and 25. By this arrangement the walls of the metal shaft are held in spaced relation against any relative movement. The collar $y$ on the plug is notched at $y'$ (see one half of the notch shown in dotted line in Fig. 25) to receive the walls of the seam of the metal shaft. The headed pin or rivet $x$ of Figs. 24 and 25 may be omitted and the edges of the notch $y'$ utilized to lock the walls of the seam together, the stem of the plug making a driving fit within the metal shaft.

Figs. 1 to 25 of the drawings are intended to show the proportional dimensions for an average shaft for the "woods", the driver, brassie and spoon, and it will be understood that shafts for the "irons" will be shorter and somewhat larger in diameter.

The metal shaft of this invention instead of being tapered, as has been described with relation to the Figs. 1 to 25, may be non-tapered, that is to say, it may be in the form of a shaft of approximately uniform diameter or cross section. The non-tapered construction makes it possible to eliminate practically all of the forming stress on the brazed joint incident to the folding operation such as illustrated in Figs. 9 and 10. In iron clubs the head impacts with the ground as well as with the ball and hence it is particularly essential with such clubs that the joint be sound and that no initial fracture occur in the forming operation.

Fig. 26 shows in end view a straight metal tube A of uniform diameter, approximately $1\frac{3}{8}''$ in diameter and having its edges overlapped $\frac{3}{16}''$, said tube being positioned in a die 55 and a steel spacer 56 being inserted in the tube. A punch 57 is then operated as shown in Fig. 27, and the upper half of the tube thereby folded down upon the steel spacer, thus producing the trough-like member or tube B of semi-annular shape in cross-section with the spacer 56 encased therein. The spacer 56 is then withdrawn and the overlapped edges are bent and interengaged in the manner the edges are interengaged in Fig. 5. The steel spacer 56 is then reinserted in tube B and the interengaged edges are compressed by again placing the tube in die 55 and subjected it to the action of punch 57. The tube is then removed from die 55 and the spacer 56 withdrawn from the tube. A copper alloy strip C is now laid along the interengaged edges at the seam or joint, a covering of asbestos D is applied around the tube B, a carbon rod is laid in the tube, and a winding of wire F then applied—all as shown in Fig. 28. The whole is then put in a hydrogen atmosphere furnace and the seam or joint brazed. After brazing, the wire, carbon rod and asbestos are removed from the tube B. A lead spacer (not shown) of approximately the same dimensions as the steel spacer 56, is now inserted endwise into the tube B, and the tube containing the lead spacer is then subjected to the same operations as used for the tapered shaft beginning with that illustrated in Fig. 12 (except that non-tapered dies, arbors, etc., are employed). Fig. 29 illustrates in perspective view the straight, non-tapering tubular metal shaft G, of approximately $\frac{1}{2}''$ in diameter, which is thus produced from the $1\frac{3}{8}''$ diameter metal tube A of Fig. 26. The outer wall of both the tapered shaft and the non-tapered shaft may be reinforced where it leaves the neck of the head by inserting strips of hickory or spring steel, convex in cross-section, between the two walls of the shaft, said strips making a tight fit, and yielding under action where the shaft leaves the neck.

It should be noted that in producing this shaft of uniform diameter the steel spacer 56 can be withdrawn bodily from the tube B preparatory to the brazing operation, whereas this would not be possible with a tapered spacer in the production of a tapered shaft.

It is to be understood that the process of this invention may be varied within considerable limits, the principal characteristics thereof being the production of a blank consisting of a spacing element or core enclosed by a metal tube or sheath—which blank may be of the form shown in Fig. 11, or of any other suitable shape in cross-section—then forming said blank into a tube or shaft having an open seam extending longitudinally thereof, and then removing said spacing element or core, preferably by heat.

Experienced golfers are familiar with the torsion action of a golf club shaft, and how it functions when the ball is struck. The torsion in a hickory shaft can be seen and felt by turning the head of the club with one hand while holding the leather grip of the club tightly grasped in the other hand; a good hickory shaft twists even when comparatively little force is applied and untwists or rebounds the instant the twisting force is released. It is well known to master golfers that this torsioning, this instantaneous twisting and untwisting, when the head impacts with the ball, is the very feature that cushions the shot by absorbing the jar of impact, and contributes to a long, straight ball. This is known to be the reason why the world famous golfers have continued heretofore to use the old hickory shaft—to secure the torsion attainable only in hickory prior to this invention.

On the other hand, hickory has sundry imperfections and disadvantages. It is well known that hickory shafts are prone to warping, which renders them undesirable for their intended use. Moreover, hard, straight hickory shafts are now very scarce, and according to government statistics the supply of high grade hickory timber, suitable for the manufacture of golf shafts, is nearing its end.

Again it is found that nearly all present day hickory shafts, as they come from the machines whereby they are turned to circular cross-section, are crooked; and in order to straighten them such force is applied as tends to break down the fibers, which greatly shortens the life and also impairs the driving power of the shafts. Likewise the twisting and flexing action due to repeated impacts with the ball and with the ground also tend to injure or weaken the fibers, thus causing gradual deterioration with corresponding loss of distance and direction.

Furthermore, hickory shafts are highly sensitive to changes of temperature and humidity; the effect of rainy weather and hot weather being to increase their flexibility and degree of torsion, and vice versa.

For the foregoing reasons a hickory golf shaft lacks constancy (or dependable uniformity of condition and action); and because of its variability and its susceptibility to even the ordinary changes of weather and other conditions, it is often the major contributing cause of unsteadiness or irregularity in the play of the user. Many "off days," that are commonly attributed to the golfers themselves, are in fact "off days" for their hickory shafted clubs.

As the result of experience derived from the actual commercial manufacture of golf club shafts produced by the process of the herein described invention, and from the use thereof in actual play and under careful observation, it has been conclusively demonstrated that said shafts, having the herein described torsion seam, possess all of the desirable features of the hickory shaft, but none of its undesirable characteristics. In particular, the torsion of hickory, as imparted to a steel shaft by the herein described invention, gives these outstanding advantages over steel shafts heretofore on the market: (1) it absorbs the jar of impact, thus cushioning the "feel" of the shot; (2) it counteracts the turning of the wrists at the moment of impact, thus producing better direction; (3) it snaps the ball away on the rebound and thus contributes to a longer shot.

What is claimed is:

1. The process of making a double walled metallic tube or shaft consisting in taking a thin walled metallic tube having a spacer therein, bending said tube and the enclosed spacer into a double walled tube having contiguous edges and with the spacer interposed between said walls and determining the spacing thereof one from the other, and then removing the spacer.

2. The process of making a double walled metallic tube or shaft consisting in placing a spacer within a thin walled metallic tube, compressing the tube to the shape of the spacer, then bending said tube and a spacer enclosed thereby into a double walled tube having contiguous edges and with the spacer interposed between said walls and determining the spacing thereof one from the other, and then removing the spacer.

3. The process of making a double walled metallic tube or shaft consisting in placing a spacer of suitable material, such as lead, within a thin walled metallic tube, bending said tube and the enclosed spacer into a double walled tube having contiguous edges and with the spacer interposed between said walls and determining the spacing thereof one from the other, and then removing the spacer by melting.

4. The process of making a tapered double walled metallic tube or shaft consisting in placing a spacer of suitable material, such as lead, within a thin walled metallic tube, then bending said tube and a spacer enclosed thereby into a double walled tube with the spacer interposed between said walls and determining the spacing thereof one from the other, and then removing the spacer by melting.

5. The process of making a double walled metallic tube or shaft consisting in taking a thin walled metallic tube having therein a spacer of suitable material, such as lead, bending said tube and the enclosed spacer into a double walled tube having the spacer interposed between said walls and determining the spacing thereof one from the other and having a longitudinally extending seam formed by contiguous edges, then subjecting the double walled tube with the spacer enclosed to the action of rollers, and then removing the spacer by melting.

6. The process of making a double walled metallic tube or shaft consisting in forming a strip of thin sheet metal into a tube in which the longitudinal edges of the strip are brought together, then securing said edges together, then inserting within said tube a spacer of a material fusible at relatively low temperature, then bending said tube with the enclosed spacer into a double walled tube having contiguous edges and with the spacer interposed between said walls and determining the spacing thereof one from the other, and then removing the spacer by fusion.

7. The process consisting in forming a double walled tube or shaft having a longitudinally extending open seam formed by contiguous edges and with a spacer interposed between the walls and determining the spacing thereof one from the other, and then removing the spacer.

8. The process consisting in forming a tapered double walled tube or shaft with a spacer interposed between the walls and determining the spacing thereof one from the other, and then removing the spacer.

9. The process of making tubular shafts comprising forming a metallic tube, inserting a spacing element in said tube, shaping the sheet metal of said tube to fit closely around the spacing element, forming the blank so produced into a tube with the edges of the blank contiguous, and removing the pacing element.

10. The process of making tubular shafts comprising enclosing a spacing element in a metallic sheath to form a blank, forming the blank into a tube with the edges of the blank contiguous, and removing the spacing element.

11. The process of making tubular shafts comprising enclosing a fusible spacing element in a metallic sheath to form a blank, forming the blank into a tube with the edges of the blank contiguous, and melting and removing the spacing element.

12. The process of making tubular shafts comprising the enclosing in a metallic sheath of a spacing element fusible at a relatively low temperature, forming the blank so produced into a tube with the edges of the blank contiguous, and removing the spacing element by fusion thereof.

13. The process of making tapered tubular shafts comprising the preparing of a blank having a fusible core and a metallic sheath, forming the blank into a tapered tube, and removing the core by fusion thereof.

14. The process of making tapered tubular shafts including forming a blank consisting of a spacing element with a metallic sheath fitting thereabout, then forming said blank into a tapered tube, and then removing said spacing element.

15. The process of making tubular shafts including forming a blank consisting of a spacing element with a metallic tube fitting thereabout, then forming said blank into a tube with the edges of the blank contiguous and constituting an open seam extending longitudinally of the tube, and then removing said spacing element.

16. The process of making tubular shafts comprising forming a blank consisting of a spacing element enclosed within a sheet metal casing formed of a strip of sheet metal having its longitudinal edges secured together, forming said blank into a tube with the edges of the blank contiguous, and then removing the spacing element.

17. The process of making tapered tubular shafts comprising enclosing a spacing element in a metallic sheath to form a blank, forming said blank into a tapered tube with the edges of the blank contiguous, and removing the spacing element.

18. The process of making tapered tubular shafts comprising enclosing a spacing element in a metallic sheath to form a blank, forming said blank into a tapered tube with the edges of the blank contiguous and constituting an open seam extending longitudinally of the tube, and then removing said spacing element.

19. The process of making tubular shafts comprising enclosing a spacing element in a metallic sheath to form a blank, forming the blank into a tube by bending it from end to end simultaneously until the edges of the blank are contiguous, and then removing the spacing element.

20. The process of making tubular shafts comprising enclosing a spacing element in a metallic sheath to form a blank, forming the blank into a tube by bending it around a mandrel from end to end simultaneously until the edges of the blank are contiguous, and then removing the spacing element.

In testimony whereof I have signed this specification.

ALLAN E. LARD.